(12) United States Patent
Matsumoto

(10) Patent No.: US 6,308,015 B1
(45) Date of Patent: Oct. 23, 2001

(54) CAMERA HAVING AUTOMATIC FOCUSING DEVICE

(75) Inventor: Hisayuki Matsumoto, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/593,897

(22) Filed: Jun. 14, 2000

(30) Foreign Application Priority Data

Jun. 18, 1999 (JP) .................................................. 11-173271

(51) Int. Cl.$^7$ ........................... G03B 13/00; G03B 15/02; G03B 15/03; G03B 3/10; G03B 13/34
(52) U.S. Cl. ........................... 396/106; 396/104; 396/89; 396/95; 396/92; 396/109; 396/110; 396/121
(58) Field of Search ............................... 396/89, 95, 107, 396/108, 109, 110, 104, 106, 92, 121

(56) References Cited

U.S. PATENT DOCUMENTS

| | | | |
|---|---|---|---|
| 4,592,638 | 6/1986 | Kaneda et al. | 354/403 |
| 5,589,910 | 12/1996 | Saito et al. | 396/106 |
| 5,652,926 | 7/1997 | Saito | 396/97 |
| 5,784,654 | 7/1998 | Saito et al. | 396/104 |
| 5,915,133 | * 6/1999 | Hirai et al. | 396/48 |
| 6,173,122 | * 1/2001 | Matsumoto et al. | 396/104 |

FOREIGN PATENT DOCUMENTS

| | | |
|---|---|---|
| 60-053909 | 3/1985 | (JP) . |
| 60-068307 | 4/1985 | (JP) . |
| 63-049738 | 3/1988 | (JP) . |
| 63-259521 | 10/1988 | (JP) . |
| 7-167646 | 7/1995 | (JP) . |
| 7-168090 | 7/1995 | (JP) . |
| 8-334679 | 12/1996 | (JP) . |
| 9-005611 | 1/1997 | (JP) . |

* cited by examiner

Primary Examiner—David M. Gray
Assistant Examiner—Rochelle Blackman
(74) Attorney, Agent, or Firm—Straub & Pokotylo; John C. Pokotylo

(57) ABSTRACT

There is provided a camera with an automatic focusing device having hybrid AF unit capable of always performing a reliable automatic focusing operation on a moving object to provide a more preferable photographic result. The camera includes first distance measuring unit 4 having at least a pair of light receiving sensors, for measuring the distance of an object by receiving a beam of light from the object, second distance measuring unit 3 having light projecting unit for projecting a beam of light upon the object and light receiving unit for receiving a beam of light reflected therefrom, for measuring the distance of the object by projecting a beam of light upon the object with the light projecting unit and by receiving a beam of light reflected therefrom with the light receiving unit and distance measuring method selecting unit 2 for selecting either the first distance measuring unit or the second distance measuring unit. The distance measuring method selecting unit is controlled such that it selects the first distance measuring unit when performing an automatic focusing operation which is most suitable for photographing a moving object.

24 Claims, 7 Drawing Sheets

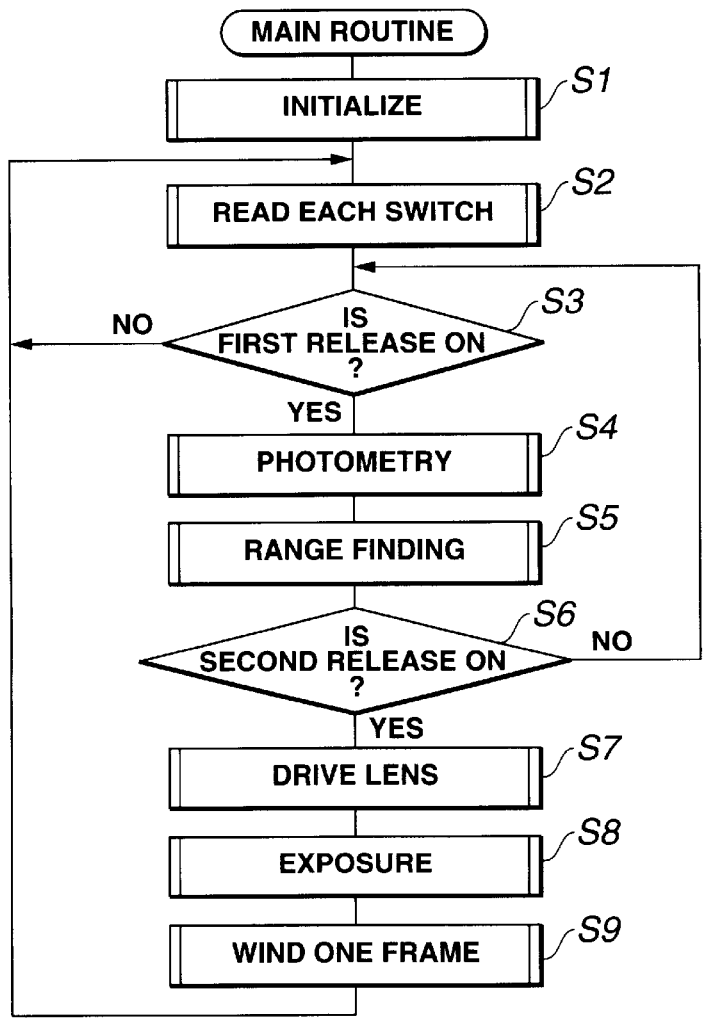
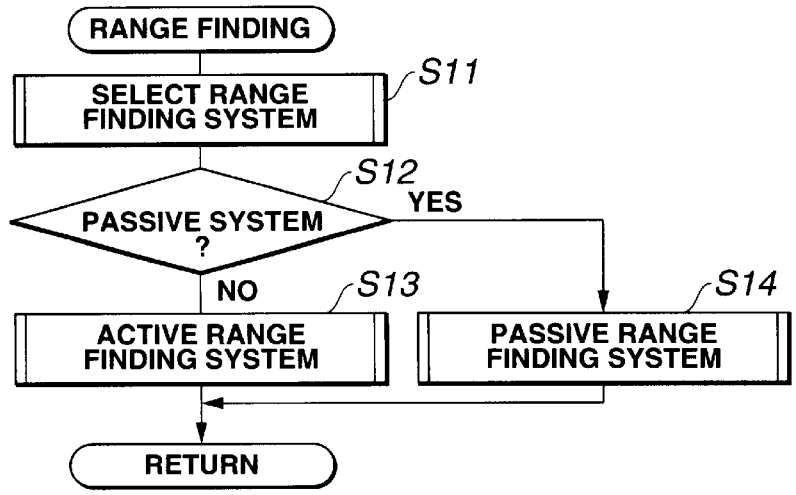

CAMERA HAVING AUTOMATIC FOCUSING DEVICE

This application claims benefit of Japanese Application No. H11-173271 filed in Japan of Jun. 18, 1999, the contents of which are incorporated by this reference.

BACKGROUND OF THE INVENTION

1. Field of the Invention

The present invention relates to a camera having an automatic focusing device and, more particularly, to a camera having an automatic focusing device with a plurality of focus detectors employing different distance measuring methods.

2. Related Background Art

Compact cameras and the like for taking pictures using a roll of photographic film have been in common practical use. Such cameras have an automatic focusing device with distance measuring means for measuring the distance of an object (hereinafter referred to as "object distance"), for automatically adjusting the focus by moving a photographic lens optical system to a predetermined position in accordance with the result of distance measurement performed by the distance measuring means.

Various methods for distance measuring means of automatic focusing devices commonly used in conventional compact cameras and the like (hereinafter simply referred to as "cameras"), e.g., passive method, active method and the like have been proposed and put in practical use.

An active distance measuring method is constituted by light projection means for radiating (projecting) a beam of light, e.g., infrared light upon an object and light, receiving means or the like for receiving reflection of the light. A predetermined beam of light is radiated (projected) upon a desired object using the light projection means, and light reflected thereby is received by the light receiving means which is a position sensitive device (PSD) or the like. Triangulation is used to calculate the distance of the object from the angle defined by the emitted beam and the incident beam.

Passive distance measuring methods are generally categorized into TTL methods which are primarily used in the so-called single-lens reflex cameras or the like and ambient light methods which are primarily used in the so-called compact cameras and the like. Both of the TTL methods and ambient light methods are constituted by pupil split means for performing pupil splitting on a beam of light from an object such that two images can be formed therefrom and light receiving means such as a charge coupled device (CCD) for receiving two beams of light split by the pupil split means. In this case, an image of each of the two beams of light from the object split by the pupil split means is formed on a light receiving surface of the light receiving means (CCD), and a difference between the phases of the two images is calculated to measure the distance between the two images.

In a TTL method, a defocusing amount of a photographic lens is calculated in accordance with the result of the measurement of the distance between two images obtained as described above. In an ambient light method, the distance of an object is calculated based on triangulation from the result of measurement of the distance between two images thus obtained.

Distance measuring means utilizing those distance measuring methods may not be able to provide reliable results of distance measurement depending on objects. For example, reliable results of distance measurement may not be obtained by using an active type distance measuring means in instances wherein the object of interest is in a backlighted state, wherein the object itself emits intense reflected light, wherein an intense reflecting member or the like is in a screen and wherein the object is at a too long distance (a too long object distance) to be reached by the light projected for distance measurement.

Accurate results of distance measurement may not be obtained by using a passive type distance measuring means in instances wherein the object of interest has low luminance or low contrast and wherein the environment around the object is an environment of low luminance.

Under such circumstances, in order to cancel the shortcomings of those means, proposals on so-called hybrid AF type distance measuring means including distance measuring means based on both of the above-described distance measuring methods, for finding the distance of an object of interest by switching the distance measuring methods appropriately depending on the object have been disclosed in, for example, Japanese examined patent publications No. H3-78602 and No. H3-78603 and Japanese unexamined patent publications No. S63-259521 and No. H7-168090 and have been put in practical use. Further, compact cameras and the like with such hybrid AF type distance measuring means have been also put in practical use recently.

When one of distance measuring means of such hybrid AF type distance measuring means (hereinafter referred to as "hybrid AF means") can not detect the focus of an object of interest, the distance measurement is performed by switching the distance measuring means to the other. This makes it possible to obtain photographic results with sufficiently good image quality, for example, when the object is stationary because reliable focusing can be performed regardless of the conditions of the object and the photographic environment.

Therefore, automatic focusing devices having such hybrid AF type distance measuring means are spreading as distance measuring means for automatic focusing devices used in recent compact cameras and the like.

However, automatic focusing devices utilizing hybrid AF type means as described above have a problem in that it is difficult to determine which of a plurality of distance measuring means based on different distance measuring methods is adequate to use for photographing, for example, an object moving at a high speed. The above-cited publications pay no consideration on this point and even make no mention on the presence of such a problem.

So-called moving object predicting AF means and the like which reflect predicted movement of an object on the result of distance measurement have been put in practical use as means for reliably focusing a moving object in conventional single-lens reflex cameras and the like.

However, the above-cited publications make no mention on the use of the above-described moving object predicting AF means in each of the distance measuring means. It is therefore thought that focus detection on a moving object utilizing the means according to the above-described publications will not provide reliable results of distance measurement (results of focusing).

In general, it is considered that the use of the above-described passive method is suitable for photographing of a moving object. The reasons are as listed below.

(1) When a moving object is photographed, the distance of the object tends to increase. Specifically, since it is difficult to photograph an object moving at a high speed, e.g., a train or automobile at close range because it is dangerous to approach it to photograph, the object distance inevitably becomes long. Since the passive method is thus suitable for distance measurement of an object at a long distance, the passive method is preferably used to photograph a moving object.

(2) In the case of the active method in which light such as infrared light is projected upon an object, it is more difficult to reliably project a beam of light upon a desired position of a moving object than projecting light upon a stationary object depending on the size of the object (the problem of occurrence of so-called missing spots). Specifically, it is difficult to continuously keep a moving object within a predetermined range for distance measurement and to continuously project a beam of illumination light upon a predetermined position of an object of interest.

(3) In general, techniques for passive type moving object predicting AF means have been accumulated in a far greater amount, and it is therefore easier to implement moving object predicting AF means using a passive method.

For the above and other reasons, the use of distance measuring means utilizing a passive method is considered more suitable for a distance measuring operation on a moving object.

The present invention has been made taking the above-described points into consideration.

SUMMARY OF THE INVENTION

It is an object of the invention to provide a camera having an automatic focusing device with so-called hybrid AF means including active distance measuring means and passive distance measuring means, which always performs a reliable automatic focusing operation on a moving object to always obtain more preferable photographic results.

Briefly, the present invention is characterized in that there is provided first distance measuring means having at least a pair of light receiving sensors, for performing a distance measurement calculation by receiving a beam of light from an object, second distance measuring means having light projecting means for projecting a beam of light upon the object and light receiving means for receiving a beam of light reflected thereby, for projecting a beam of light upon an object with the light projecting means and for receiving a beam of light reflected with the light receiving means thereby to measure the distance of the object and distance measuring method selecting means for selecting either the first distance measuring means or the second distance measuring means.

These and other objects and advantages of the present invention will become more apparent from the following detailed description.

The invention makes it possible to provide a camera having an automatic focusing device with so-called hybrid AF means including active distance measuring means and passive distance measuring means, which has an automatic focusing device capable of always performing a reliable automatic focusing operation on a moving object to always obtain more preferable photographic results.

BRIEF DESCRIPTION OF THE DRAWINGS

FIG. 6 is a flow chart of a main routine showing a flow of major operations of the camera in FIG. 1.

FIG. 7 is a flow chart showing a schematic flow of a distance measuring process performed by the camera in FIG. 1.

DETAILED DESCRIPTION OF THE PREFERRED EMBODIMENTS

Figure 1:
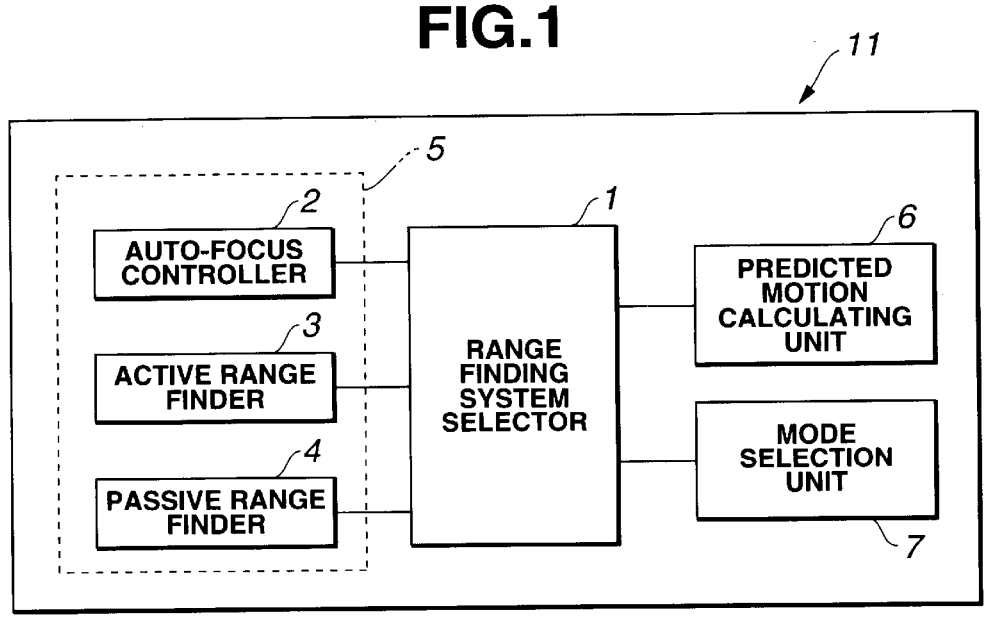
FIG. 1 is a conceptual diagram showing a concept of the present invention.

A concept of the present invention will now be described with reference to the conceptual diagram in FIG. 1.

An automatic focusing device of a camera 11 according to the invention is configured by connecting various modules to an automatic focus control unit, the modules including a hybrid distance measuring unit 5 constituted by a plurality of distance measuring portions 2,3,4 based on different distance measuring methods and a selecting portion 1 for selecting one of the plurality of distance measuring portions to be used, a motion prediction calculation unit 6 which is motion determining means for performing a predictive calculation to allow a focusing operation on a moving object by detecting a motion of the moving object and a photographic mode selecting unit 7 which is photographic mode selecting means for selecting and specifying various photographic modes of the camera. The automatic focus control unit performs entire control associated with an automatic focusing operation of this apparatus.

The hybrid distance measuring unit 5 is formed by an active distance measuring portion 3 which is second distance measuring means, i.e., a module for performing a distance measuring operation based on an active method, a passive distance measuring portion 4 which is first distance measuring means, i.e., a module for performing a distance measuring operation based on a passive method, a distance measuring method selecting unit 2 which is distance measuring method selecting means for selecting either the active distance measuring portion 3 or passive distance measuring portion 4 to perform a distance measuring operation and the like.

The present invention will now be described with reference to an illustrated embodiment.

Figure 2:
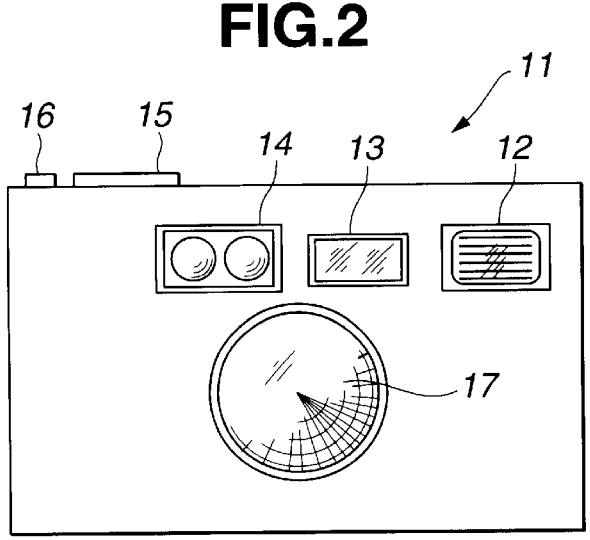
FIG. 2 is a front view of a camera having an automatic focusing device according to a first embodiment of the invention showing appearance of the same.

FIG. 2 is a front view of a camera having an automatic focusing device according to a first embodiment of the invention showing the appearance of the same.

A camera 11 having an automatic focusing device according to the present embodiment is configured with an automatic focusing device having hybrid AF means corresponding to the hybrid distance measuring unit 5 in FIG. 1, the hybrid AF means having distance measuring means based on two different distance measuring methods, i.e., passive type distance measuring means which is first distance measuring means corresponding to the passive distance measuring unit 4 in FIG. 1 and active type distance measuring means which is second distance measuring means corresponding to the active distance measuring unit 3 in FIG. 1.

A lens barrel for holding a photographic lens optical system 17 is provided substantially in the middle of the front side of the camera 11 as shown in FIG. 2, and a finder optical system 13 for forming an observation image in a predetermined position near a top surface of the camera 11 and a hybrid AF module 14 that constitutes the hybrid AF means are disposed in the vicinity of the same. A strobe device 12 for illuminating an object with illumination light by emitting flash light is provided in a predetermined position near the top surface on one end of the front side of the camera 11. On the top surface of the camera 11, there is disposed a photographic mode selecting member 15 which is an operating member for selecting a photographic mode corresponding to the photographic mode selecting unit 7 in FIG. 1, a release button 16 which is an operating member for generating a release signal and the like, display means (not shown) constituted by a liquid crystal display (LCD) panel or the like for providing visual indications such as set conditions of the camera 11 and the like.

In the present embodiment, the photographic mode selecting member 15 is disposed on the upper surface of the camera 11. However, there is no need for limiting the photographic mode selecting member 15 to such a location, and it may be provided in a predetermined position, for example, on the rear side of the camera 11.

The release button 16 cooperates with a common two-position switch adapted to a two-step-operation. Specifically, a first release signal for starting, for example, a photometric operation or distance measuring operation is generated in conjunction with the first step of the operation of the release button 16 (referred to as "first release"), and a second release signal for starting an actual photographic operation (exposure operation) is generated in conjunction with the second step of the operation of the button 16 (referred to as "second release").

Next, a description will now be made with reference to FIG. 3 on an example of a specific configuration of the photographic mode selecting member 15.

Figure 3:
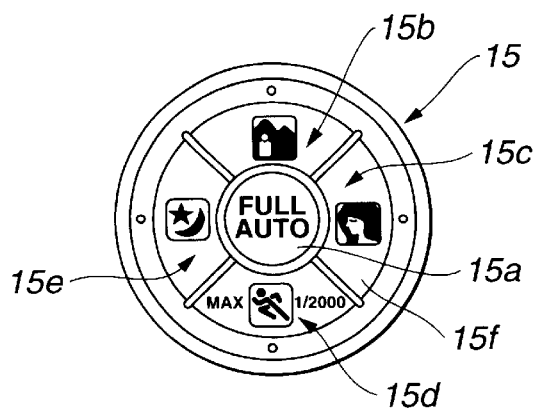
FIG. 3 illustrates an example of an operating surface of a photographic mode selecting unit (photographic mode selecting dial) of the camera in FIG. 2.

FIG. 3 is a diagram of an example of a configuration of the photographic mode selecting member 15 which is a photographic mode selecting unit of the camera, showing an operating surface of the same.

The photographic mode selecting member 15 of the camera 11 is provided in a predetermined position on the top surface of the camera 11 as described above and is formed by a center button 15a provided substantially in the middle such that it can be protruded and retracted by an urging force of an urging member (not shown) or the like and an outer button 15f disposed around the center button 15a such that it can be swung in four directions, an operation of pressing the center button 15a or pressing a predetermined position of the outer button 15f allows selection of and switching to a desired photographic mode among preset various photographic modes.

The photographic mode which is switched on by pressing the center button 15a of the photographic mode selecting member 15 is a full automatic mode. The full automatic mode is a so-called full automatic photographic mode in which an adequate shutter numerical aperture is automatically set by control means of the camera 11 in accordance with the environment of an object of interest.

The photographic mode which is switched on by pressing a predetermined region indicated by reference number 15b of the outer button 15f of the photographic mode selecting member 15 is a landscape mode. The landscape mode is a photographic mode suitable for photographing landscape or the like where an object of interest is located at a relatively long distance, in which a shutter numerical aperture is automatically set by the control means of the camera 11 such that the stop value increases (the diaphragm aperture decreases) in order to set the depth of field as large as possible.

The photographic mode which is switched on by pressing a predetermined region indicated by reference number 15c of the outer button 15f of the photographic mode selecting member 15 is a portrait mode. The portrait mode is a photographic mode suitable for photographing a person (portrait photographing) in which a shutter numerical aperture is automatically set by the control means of the camera 11 such that a small depth of field is set conversely to the above-described landscape mode.

The photographic mode which is switched on by pressing a predetermined region indicated by reference number 15d of the outer button 15f of the photographic mode selecting member 15 is a sports mode. The sports mode is a photographic mode suitable for photographing a moving object in which a stop value and a shutter speed are automatically set by the control means of the camera 11 such that the shutter speed is increased.

The photographic mode which is switched on by pressing a predetermined region indicated by reference number 15e of the outer button 15f of the photographic mode selecting member 15 is a night scene mode. The night scene mode is a photographic mode suitable for photographing a night scene or the like in which a shutter speed and a stop value that allow prolonged exposure are automatically set by the control means of the camera 11.

The above-described five photographic modes are set in advance in the camera 11, and the best photographic mode for photographing a moving object is the sports mode. In the present embodiment, therefore, a moving object predicting calculation is performed when the sports mode is selected as the photographic mode of the camera 11.

Figure 4:
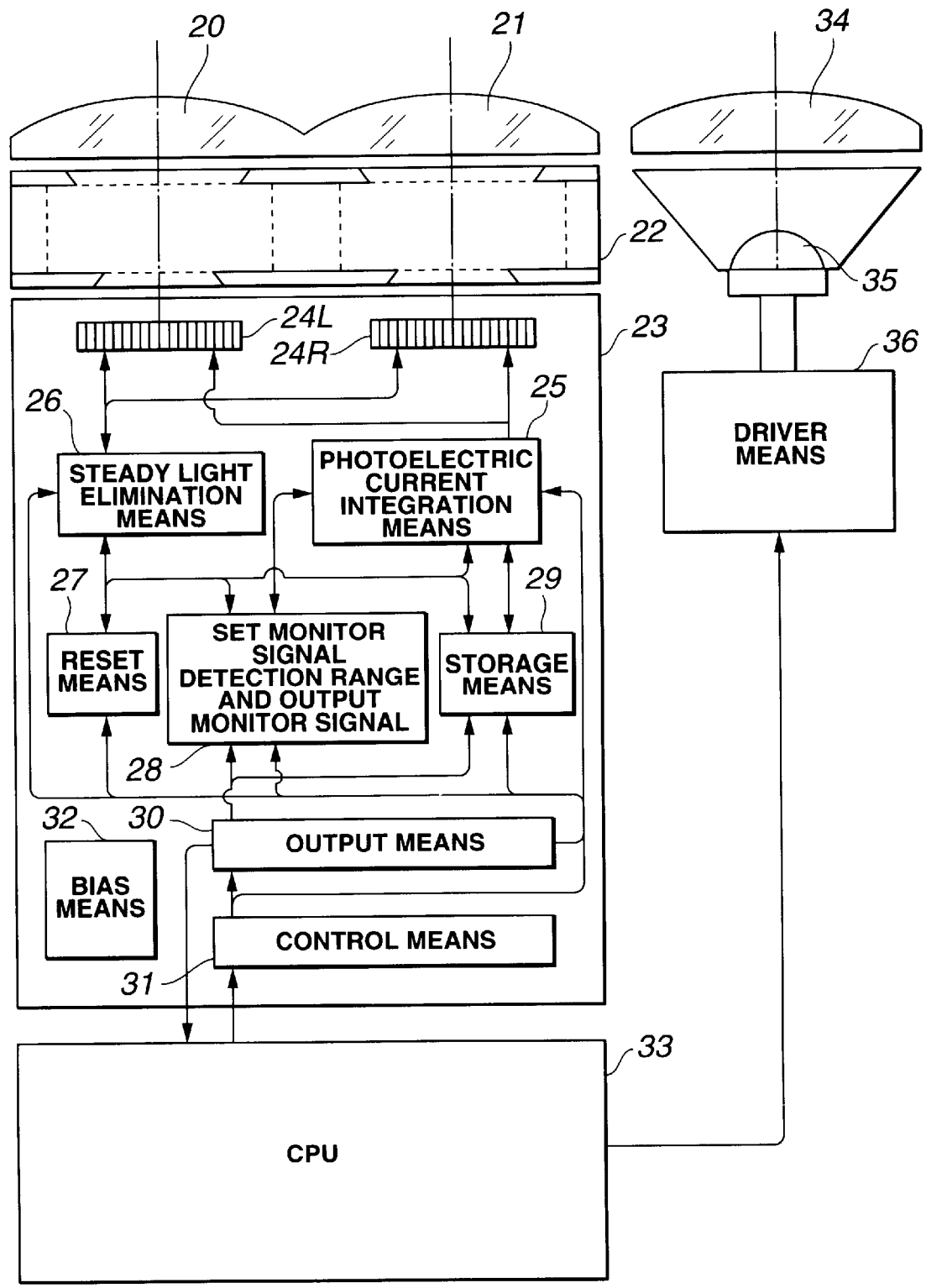
FIG. 4 is a block configuration diagram of major parts of a hybrid AF module of the automatic focusing device of the camera in FIG. 2 showing a detailed configuration of the same.

A description will now be made with reference to the configuration diagram of major parts in FIG. 4 on a specific configuration of the hybrid AF module 14 of the automatic focusing device of the camera 11 in the present embodiment.

The hybrid AF module 14 of the camera 11 has a configuration as described below. It is specifically formed by a pair of image forming (light receiving) lenses 20 and 21 for collecting a beam of light from an object, a housing 22 for maintaining an optical path for each of the image forming lenses 20 and 21, for splitting the beam of light from the object into two beams and for preventing unnecessary external beams of light from entering the optical paths, an automatic focus detecting circuit (AF-IC) 23 formed by integrating various circuits required for focus detection, a CPU 33 responsible for overall control of the camera 11 including control over the sequence of a distance measuring operation as a whole, light projecting means required for an active distance measuring operation or the like.

The inner wall of the housing 22 is formed of a material which is in a dark color, e.g., black and which has excellent light-blocking properties. This prevents irregular reflection of beams of light from an object transmitted by the image forming lenses 20 and 21 inside the housing 22.

The AF-IC 23 is formed by a pair of line sensors 24L and 24R (a pair of light receiving sensors: L and R stand for left and right, respectively) for focus detection which are light receiving means constituted by a collection of light receiving elements each of which receives beams of light collected by the image forming lenses 20 and 21 and photoelectrically converts them into an electrical signal, photoelectric current integrating means 25 for integrating photoelectric currents photoelectrically converted each element of the line sensors 24L and 24R in a capacitor associated with each element, steady light eliminating means 26 for storing a steady photoelectric current corresponding to an optical component associated with a background portion of an image among the photoelectric currents photoelectrically converted by each element and for eliminating the same, reset means 27 for resetting each circuit in the AF-IC 23, monitor signal detecting range setting/monitor signal output means 28 (hereinafter simply referred to as "monitor signal outputting means 28") for setting an arbitrary region in the photoelectric current integrating means 25, for detecting a maximum integrated amount of photoelectric currents in the set region and for outputting the detected value as a monitor signal, storage means 29 for storing and maintaining an integrated amount which is a result of the integration at the photoelectric current integrating means 25, output means 30 for outputting the monitor signal from the monitor signal output means 28 and the contents stored in the storage means 29 to the CPU 33, control means 31 for controlling each circuit in the AF-IC 23 based on a control signal from the CPU 33, bias means 32 which is a collection of voltage sources and current sources and the like.

The steady light eliminating means 26 is used when an active distance measuring operation is performed. The monitor signal output by the monitor signal output means 28 is a signal indicating the progress of the integrating process which is used to control the integrating process.

The output means 30 may have a configuration including amplifying means for amplifying signals.

Further, the light projecting means is formed by a light emitting element 35 for emitting a predetermined beam of illumination light such as infrared light, driver means 36 for driving the light emitting element 35, a projection lens 34 for collecting the beam of light such as infrared light emitted by the light emitting element 35 and for projecting the same in a predetermined direction, i.e., upon an object and the like.

In general, a light emitting element such as an infrared emitting diode (IRED) is used as the light emitting element 35.

A brief description will now be made with reference to FIG. 5 in addition to the above-described FIG. 4 on a principle behind a distance measuring operation of a common hybrid type automatic focusing device.

Figure 5:
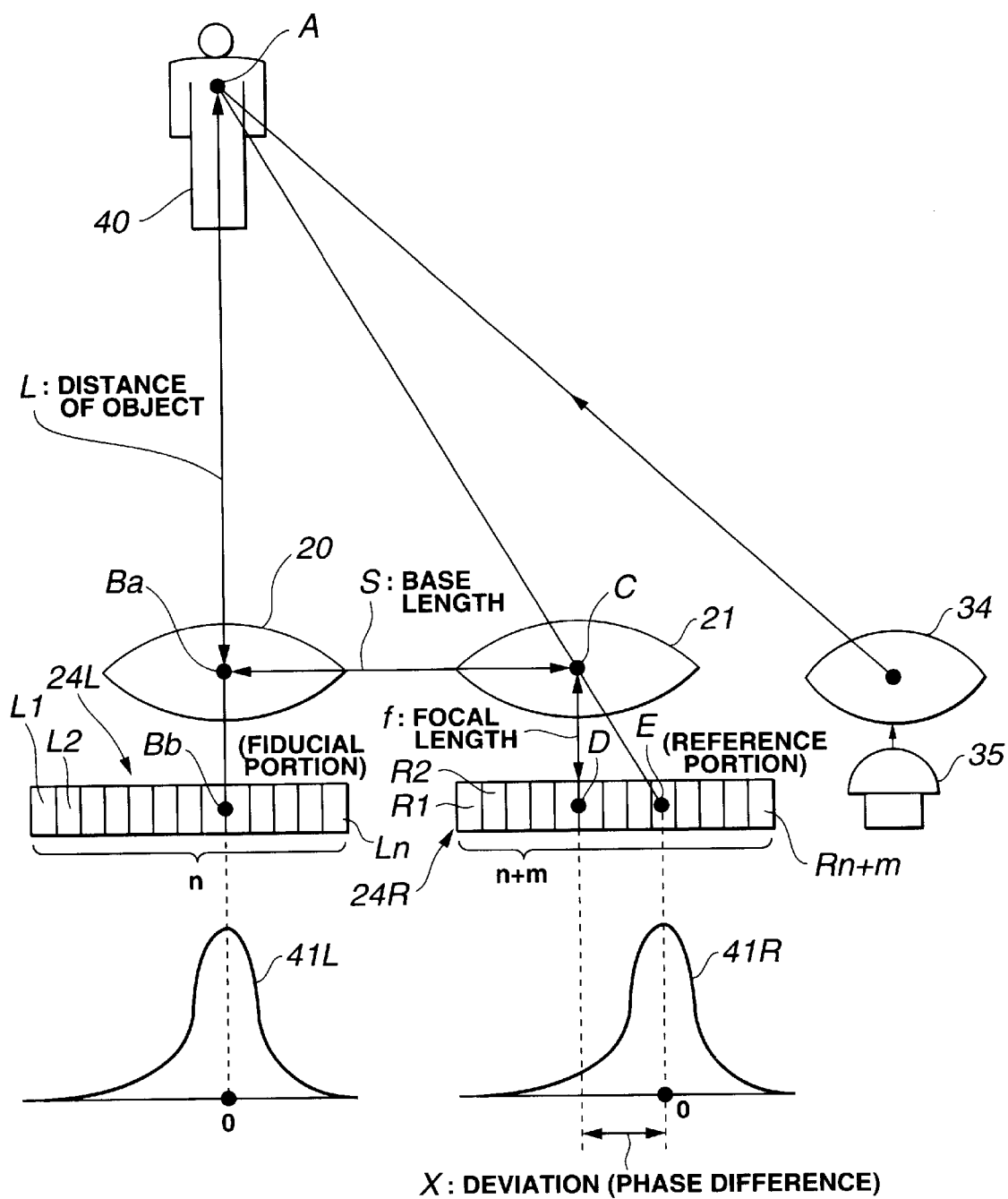
FIG. 5 is a diagram conceptually showing a general configuration of a hybrid AF type automatic focusing device of a conventional camera.

FIG. 5 is a diagram conceptually showing a general configuration of a hybrid AF type automatic focusing device having a configuration including a plurality of distance measuring means such that passive and active distance measuring methods can be switched depending on the photographic environment and the like.

A common hybrid type automatic focusing device is formed by a pair of image forming lenses 20 and 21, a pair of line sensors 24L and 24R associated therewith and the like. For example, the line sensors 24L and 24R are constituted by CMOS (complementary metal oxide semiconductor) type one-dimensional line sensors or the like.

Light projecting means constituted by a light emitting element 35 and a projection lens 34 and the like is provided in parallel with the image forming lenses 20 and 21 and the line sensors 24L and 24R. The light projecting means is used when an active distance measuring operation is performed. When the light emitting element 35 emits light, the beam of illumination light is projected upon an object 40 through the projection lens 34.

The image forming lenses 20 and 21 are spaced from each other at a base length S, and the line sensors 24L and 24R are respectively provided behind the lenses 20 and 21 on the respective optical axes of the lenses 20 and 21 in positions apart from them by a focal length f.

The line sensor 24L is formed by arranging n elements through Ln in parallel, and the line sensor 24R is formed by arranging n+m elements R1 through R(n+m).

In the hybrid AF type automatic focusing device having such a configuration, beams of light entering the image forming lenses 20 and 21 respectively from a point A of the object 40 in a position at a distance (hereinafter referred to as "object distance") L form images in points in the respective line sensors 24L and 24R. Output signals of image information from the elements of the line sensors 24L and 24R can be graphically represented by curves as shown in FIG. 5. While the output signals 41L and 41R are infrared light reflected by the object 40 in the case of an active distance measuring operation and are beams of natural light from the object 40 in the case of a passive distance measuring operation, the distance of an object can be calculated using completely the same method in either case.

The line sensor 24L among the pair of line sensors 24L and 24R is referred to as "fiducial portion", and the other line sensor 24R is referred to as "reference portion". In this case, a beam of light from the point A of the object 40 which has passed through a center point Ba on the optical axis of the image forming lens 20 forms an image on an image forming point Bb at the fiducial portion (24L). At the reference portion (24R), a beam of light from the same point A which has passed through a center point C on the optical axis of the image forming lens 21 forms an image on an image forming point E. The image forming point E moves in the horizontal direction of the line sensor 24R as the object distance L changes. That is, the smaller the object distance L, the farther the image forming point E from the position on the sensor 24R corresponding to the image forming point Bb, i.e., a reference point D. The greater the object distance L, the closer the image forming point E to the reference point D. When the object is at infinity, an image is formed on the image forming point E which substantially coincides with the reference point D.

The amount of deviation between the reference point D of the line sensor 24R at the reference portion corresponding to the image forming point Bb of the line sensor 24L at the fiducial portion and the image forming point for the point A of the object 40 at the reference portion, i.e., the image forming point E of the beam of light from the point A which has passed though the center point C on the optical axis of the image forming lens 21 varies in accordance with the object distance L. Therefore, distance data relating to the object distance L can be obtained by calculating such an amount of deviation during a distance measuring operation.

More specifically, the correlation between a sensor output signal of image information at the image forming point Bb of the line sensor 24L at the fiducial portion and a sensor output signal of image information of the line sensor 24R at the reference portion is calculated. An amount of deviation (phase difference) X between the image forming point Bb, i.e., reference point D and the image forming point E is calculated by detecting the point at which those sensor signals show the highest similarity to each other (the image forming point E in this case).

A more detailed description will now be made on calculations to find the amount of deviation X. First, a calculation is performed to find the sum of absolute values of differences between sensor output signals of image information from the fiducial portion and the sensor output signals of image information from the reference portion, i.e., correlation values are calculated. This calculation is performed for all elements of the fiducial portion and reference portion associated with each other, and the element that provides a minimum calculated correlation value becomes the image forming point. Therefore, the object distance can be found by calculating the amount of deviation between the image forming point thus calculated and the above-described fiducial point.

More specifically, in the example shown in FIG. 5, the calculation is performed between the element L1 at the fiducial portion and the element R1 at the reference portion, and the calculation is then performed between the elements L2 and R2. Similarly, correlation is performed up to the elements Ln and Rn. The following equation is used for the correlation calculation at this time.

$$S(1) = \sum_{a=1}^{n} |La - Ra| \qquad \text{Equation 1}$$

Subsequently, a similar correlation calculation is performed with the elements at the reference portion shifted by one place. That is, correlation is calculated between output values of the elements L1 through Ln at the fiducial portion and output values of the elements R2 through R(n+1) at the reference portion. After a series of correlation calculations is performed with the elements at the reference portion shifted by m places in such a manner, a minimum value is found from among all correlation values. Since the element that provides the minimum value is the image forming point, the amount of deviation is identified from the number of shifts required to reach the image forming point.

In order to obtain a more accurate amount of deviation, an interpolating calculation may be performed using a minimum correlation value identified as described above and a value in the vicinity of the same to calculate an extreme value of the curve of correlation values, and the number of shifts required to reach that point may be converted into an amount of deviation.

Further, an object distance is identified based on an amount of deviation calculated in such a manner. Conversion of such an object distance L into distance data is calculated using the following equation where S represents the base length; f represents the focal length of the image forming lenses 20 and 21; and X represents the amount of deviation.

$$L = (S \times f)/X \qquad \text{Equation 2}$$

When focusing is performed based on the distance data of an object distance L thus identified, the distance data of the object distance L is converted into displacement from a reference position (e.g., a position at infinity or the like) of the photographic lens, and the photographic lens is moved in an amount corresponding to the displacement.

A multi-point distance measuring device having a plurality of measuring points in a photographic screen can be configured by providing a plurality of distance measuring device as shown in FIG. 5. A multi-point distance measuring device may be also provided by dividing a single line sensor into a plurality of regions and configuring a device as shown in FIG. 5 in each of the regions.

A description will now be made on operations of the camera 11 having the automatic focusing device according to the first embodiment configured as described above.

Operations of the camera 11 as a whole will now be described with reference to FIG. 6. FIG. 6 is a flow chart of a main routine showing a flow of major operations of the camera.

The camera 11 is activated by turning a main power supply switch (not shown) of the camera 11 on. At step S1, an initializing process is performed in response to an on signal from the power switch to set the camera 11 in a so-called standby state for photography in which a photographic operation can be performed by initializing constituent members, e.g., initializing the CPU 33 and moving the photographic lens optical system 17 to an initial position.

Next, at step S2, the CPU 33 reads signals from predetermined controls provided on the camera 11 including switches cooperating the mode selecting member 15 to perform a process of displaying set states of the camera 11 with the display means.

At step S3, the CPU 33 determines whether the first step of the operation of the release button 16 has been performed or not by checking a signal from the first release switch cooperating therewith. If the CPU 33 recognizes a predetermined signal from the first release switch and determines that the first step of the operation of the release button 16 has been performed, the process proceeds the next step S4. If the predetermined signal from the first release switch is not recognized and it is determined that the first step of the operation of the release button 16 has not been performed, the process returns to step S2 to repeat the above-described processes.

At step S4, a photometric element (not shown) is used to measure the luminance of an object, and a photometric process is performed to calculate a shutter speed, a stop value and the like to achieve proper exposure for photographing the object of interest.

Next, at step S5, the CPU 33 performs a distance measuring process in which the above-described hybrid AF type automatic focusing device is controlled to measure the distance of the object and to acquire information required for an automatic focusing operation (AF operation). This distance measuring process will be detailed later (see FIGS. 7 through 9 ).

At step S6, the CPU 33 determines whether the second step of the operation of the release button 16 has been performed or not by checking a signal from the second release switch cooperating therewith. If the CPU 33 recognizes a predetermined signal from the second release switch and determines that the second step of the operation of the release button 16 has been performed, the process proceeds the next step S7. If the predetermined signal from the second release switch is not recognized and it is determined that the second step of the operation of the release button 16 has not been performed, the process returns to step S3 to repeat the above-described processes. That is, if the first release state of the release button 16 is maintained, the photometric process and distance measuring process are repeated.

Next, at step S7, the CPU 33 performs a lens driving process in which the driving of the photographic lens optical system 17 is controlled based on the result of the above-described distance measuring process at step S5 to move it to a predetermined focus position.

At step S8, the CPU 33 controls the driving of shutter means (not shown) and the like based on the result of the above-described photometric process at step S4 to perform a predetermined exposure process.

After the exposure process is completed, at step S9, the CPU 33 performs a one frame winding process in which the film is wound by one frame to set the next photographic frame in a predetermined position. The process then returns to step S2 to enter a standby state for the next photographic operation.

Details of the distance measuring (or "range finding") process in the above-described main routine will now be described. For processes performed by the camera 11 other than the distance measuring process, conventional means are used which will not be described in detail here because they are not directly related to the invention.

FIG. 7 is a flow chart showing a schematic flow of the distance measuring (or "range finding") process performed by the camera 11. The sequence shown in FIG. 7 is a subroutine which corresponds to the step S5 in FIG. 6 described above.

The sequence of the distance measuring process is a process of determining and selecting a passive or active method as the method of distance measuring operation to be performed in accordance with the state of the photographic mode selecting member 15 corresponding to the photographic mode selecting unit 7 with the control means 31 corresponding to the distance measuring method selecting portion 2 of the hybrid distance measuring unit 5 (AF-IC 23) and performing a distance measuring operation based on the selected distance measuring method.

At step S11, a subroutine of the distance measuring method selection process is first carried out. In the distance measuring method selection process, the CPU 33 checks the state of the photographic mode selecting member 15 and determines which of the passive and active methods is adequate as a distance measuring method in accordance with the photographic mode set by the photographic mode selecting member 15 to select a predetermined method.

Next, it is checked at step S12 whether the distance measuring method selected at the above-described step S11 is the passive method or not. When it is determined here that the selected distance measuring method is the passive method, the process proceeds to step S14 where the sequence is terminated (return occurs) after a passive distance measuring process including a moving object predicting calculation and the like is performed.

When it is determined here that the selected distance measuring method is the active method, the process proceeds to step S13 where the sequence is terminated (return occurs) after an active distance measuring process is performed.

In the present embodiment, a moving object predicting calculation is performed when the optimum photographic mode for photographing a moving object, i.e., the sports mode is selected from among the preset plurality of (five) photographic modes as described above. In this case, the passive distance measuring process is performed.

Distance measuring methods selected for the other photographic modes are as follows.

(1) When the center button 15a of the photographic mode selecting member 15 has been operated to set the full automatic mode, neither of the distance measuring methods can be regarded advantageous. Therefore, one distance measuring method is selected when a distance measuring operation based on the other distance measuring method does not allow successful measurement.

(1-1) When the execution of a distance measuring operation based on the active method does not provide measurement results, the passive method is selected (means disclosed in Japanese unexamined patent publication No. S63-259521 incorporated herein for reference)

(1-2) When the execution of a distance measuring operation based on the passive method does not provide measurement results, the active method is selected (means disclosed in Japanese unexamined patent publication No. S63-49738)

(2) When the region 15b of the outer button 15f of the photographic mode selecting member 15 has been operated to set the landscape mode, the passive method is selected because the object of interest is likely to be located at a relatively long distance (means disclosed in Japanese examined patent publication No. H3-78603 incorporated herein for reference)

(3) When the region 15c of the outer button 15f of the photographic mode selecting member 15 has been operated to set the portrait mode, neither of the distance measuring methods can be simply regarded advantageous. In this case, however, it is considered preferable to select the passive method with priority in consideration to the fact that the scene tends to be in a backlighted state and that the so-called missing center phenomenon which is a shortcoming of an active distance measurement operation occurs when for example two people stand side-by-side as primary objects in the vicinity of the screen center.

(4) When the region 15e of the outer button 15f of the photographic mode selecting member 15 has been operated to set the night scene mode, the active method is selected which is advantageous for a distance measuring operation at a low luminance (means disclosed in Japanese unexamined patent publication No. H9-5611)

The following table 1 summarizes the distance measuring methods to be selected with priority in accordance with the photographic modes set when a distance measuring operation is performed by the camera 11.

TABLE 1

| Photographic mode | AF method to be selected with priority |
| --- | --- |
| Full automatic mode | One method is selected if distance measurement with other method is unsuccessful |
| Landscape mode | Passive method is selected |
| Portrait mode | Passive method is selected |
| Sports mode | Passive method is selected |
| Night scene mode | Active method is selected |

Further, criteria for determination of a distance measuring method to be used for an object of interest other than the above-described criteria based on the photographic modes are as follows.

(5) When it is determined the luminance of the object is lower than a predetermined value as a result of the execution of a photometric operation, the active distance measuring method is selected (the means disclosed in Japanese unexamined patent publication No. H7-167646).

(6) When it is determined the object is backlighted as a result of the execution of a photometric operation, the passive distance measuring method is selected (the means disclosed in Japanese unexamined patent publication No. H7-168090).

(7) When a successive shooting mode is set to allow successive photographing, the active distance measuring method is selected (the means disclosed in Japanese unexamined patent publication No. H8-334679).

Those means are used in the present embodiment.

A passive distance measuring (or "range finding") process corresponding to the above-described step S14 in FIG. 7 will now be detailed with reference to the flow chart in FIG. 8.

At step S21, the CPU 33 first initializes (resets) the AF-IC 23 and thereafter controls the line sensors 24L and 24R through the control means 31 to start a process of accumulating (integrating) photoelectrically converted charges.

At step S22, the control means 31 checks whether an integrating operation based on a monitor signal output from the monitor signal output 28 has been completed or not. That is, the process waits for the termination of the integrating operation and proceeds to the next step S23 when the termination of the integrating operation is confirmed.

At step S23, an output signal from each pixel of the line sensors 24L and 24R is output to an A-D converter (not shown) to be subjected to an A-D conversion process at the A-D converter. Thereafter, the digitized output signal is stored in a RAM (not shown) provided in the CPU 33 as sensor data (sensor data read process).

At step S24, the CPU 33 receives output signals 41L and 41R from the pixels of the line sensors 24L and 24R and performs a correlation calculating process based on Equation 1.

At step S25, the CPU 33 determines whether the correlation calculation was successful (whether an effective result of focus detection can be obtained) by determining whether the correlation calculating process at the above-described step S24 provided a predetermined value or not. For example, if it is determined here that the correlation calculation was unsuccessful for reasons such as a low contrast of the object, the process proceeds to step S26 where the series of processes is terminated after a detection disable process is performed (return occurs). The detection disable process performed here is a process of warning the user of the fact that the focus detecting operation is disabled by, for example, causing an LED (not shown) to blink or a process of switching to the active distance measuring method for the distance measuring operation to follow the termination of the current passive distance measuring operation.

When the next step S27 is entered as a result of determination of a successful correlation calculating process at the above-described step S25, an arithmetic process for calculating an amount of deviation X0 is performed at step S27 based on the result obtained by the correlation calculation at the above-described step S24. Then, a process of calculating the object distance L is performed at step S28 using Equation 2.

Next, it is determined at step s 29 whether the photographic mode set in the camera 11 is the sports mode or not. That is, the CPU 33 checks the signal generated when the region indicated by reference number 15d of the outer button 15f of the photographic mode selecting member 15 is pressed.

When it is determined that the sports mode is not set, the process proceeds to step S30 where a driving amount calculating process for calculating a driving amount for the photographic lens optical system 17 is performed based on the object distance L obtained at the above-described step S28 or an object distance L' obtained at step S44 to be described later, and the sequence of operations is thereafter terminated (return occurs).

When it is determined at the above-described step S29 that the sports mode is set, a series of processes starting with the next step S31 is performed to carry out a moving object predicting calculation.

At steps S31 through S35, the same processes as those at the above-described steps S21 through S25 are performed again. Let us assume here that T1 represents the time spent from the beginning of the first integration by the process at the above-described step S21 until the termination of the current integration at step S31.

When it is confirmed that the correlation calculation is disabled (i.e., did not work properly) at the next step S35, the moving object predicting calculation is stopped, and the process proceeds to the above-described step S30. At step S30, a process is performed to calculate a driving amount for the photographic lens optical system. 17 based on the object distance L obtained at the above-described step S28. The sequence is then terminated (return occurs).

When it is confirmed at step S35 that the correlation calculation has provided a result of focus detection, the process proceeds to step S36 where a process of calculating an amount of deviation X1 is performed based on the result of the correlation calculation.

At steps S37 through S41, the same processes as those at the above-described steps S21 through S25 are performed again. Let us assume here that T2 represents the time spent from the beginning of the first integration by the process at the above-described step S21 until the termination of the current integration at step S37.

When it is determined that the correlation calculation is disabled (i.e., did not work properly) at the next step S41, the moving object predicting calculation is stopped, and the process proceeds to the above-described step S30. At step S30, a process is performed to calculate a driving amount for the photographic lens optical system 17 based on the object distance L obtained at the above-described step S28. The sequence is then terminated (return occurs).

When it is determined at step S41 that the correlation calculation has provided a result of focus detection, the process proceeds to step S42 where a process of calculating an amount of deviation X2 is performed based on the result of the correlation calculation.

A moving object predicting calculation process is then performed at the next step S43. Specifically, an amount of deviation Xn expected after a predetermined period is calculated. The predetermined period is a period spent from the point in time T2, i.e., the end of the integrating process at step S37 until the termination of an operation of driving the photographic lens optical system 17 and an exposure operation which are performed after the moving object predicting calculation is completed. A predetermined fixed value is set as this period.

Figure 9:
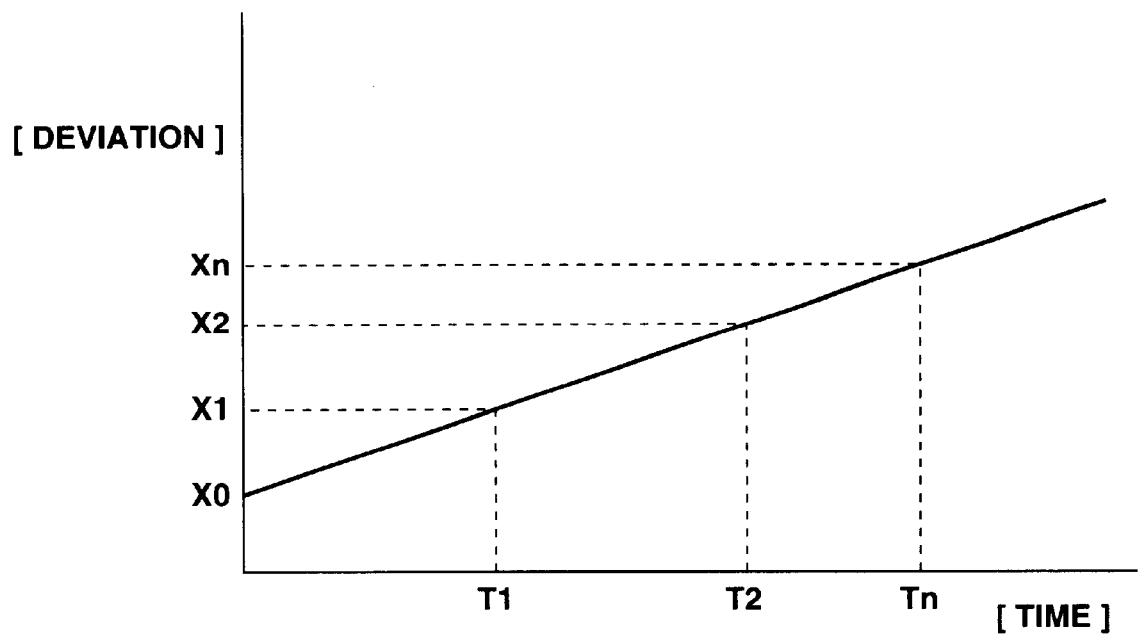
FIG. 9 is a diagram showing the relationship between amounts of deviation found by the distance measuring operation in FIG. 8 and time.

FIG. 9 is a diagram showing the relationship between the amounts of deviation X0, X1, X2, . . . , Xn and points in time T1, T2, . . . , Tn obtained as described above.

The moving object predicting calculation process performed at the above-described step S43 is a process of calculating the predicted amount of deviation Xn at the point in time Tn which is reached when a predetermined time passes after the point in time T2 as a function based on the amounts of deviation X0, X1 and X2 and the points in time T1 and T2. Specifically, the predicted amount of deviation Xn is obtained from Equation 3 shown below.

$$Xn = f(X0, X1, X2, T1, T2) + \alpha \qquad \text{Equation 3}$$

Instead of linear prediction as shown in FIG. 9, for example, curvilinear prediction may be performed in which emphasis is put on the value of a newly detected amount of deviation. The value $\alpha$ in Equation 3 is a correction term for this purpose to accommodate an image surface drawing an accelerating locus which can result when the object moves at a high speed, when the photographic lens optical system 17 has a large local length or when the object distance is relatively small. That is the predicted amount of deviation Xn may be increased as the object speed or the focal length of the photographic lens optical system 17 increases or as the object distance decreases.

Referring back to FIG. 8, at step S44, a process of calculating the predicted object distance L' is performed based on Equation 2 using the predicted amount of deviation Xn calculated by the moving object predicting calculation process at the above-described step S43.

Thereafter, the process returns to the above-described step S30 where a process of calculating a driving amount is similarly performed and the sequence is terminated (return occurs).

The active distance measuring process corresponding to the above-described step S13 in FIG. 7 will not be described in detail because it has a common flow of processes as described with reference to FIG. 5.

As described above, according to the first embodiment, when the photographic mode selected by a user of the camera is a photographic mode suitable for a moving object (sports mode), a passive distance measuring operation which is most suitable for such a photographic mode is automatically performed. It is therefore possible to obtain a reliable result of distance measurement.

In the present embodiment, focus detection on a moving object is performed three times as described with reference to FIG. 8. The accuracy of a predictable result of focus detection becomes higher, the greater the number of times of the integrating process. Therefore, there is no need for limiting the number of times of focus detection on a moving object to three, and the integrating process may be performed a greater number of times. The longer the time made available for a distance measuring operation, the greater the number of integrating process. This increases the time spent after the generation of a release signal and before the beginning of an actual exposure operation. This also increases the time lag between the execution of the release operation and the beginning of the exposure operation.

A second embodiment of the present invention will now be described.

The second embodiment of the present embodiment has substantially the same configuration as that of the first embodiment except for a small difference in control during a distance measuring operation. Specifically, in the first embodiment, when the moving object predicting calculation process is performed when the sports mode is set as the photographic mode of the camera, i.e., when a moving object is photographed, a distance measuring operation is carried out based on the passive distance measuring method. The second embodiment is different in that the moving object predicting calculation process is performed even when the center button 15a of the photographic mode selecting member 15 has been operated to set the full automatic mode.

The second embodiment is similar to the first embodiment in that a passive distance measuring operation is performed along with the moving object predicting calculation process when the sports mode is set.

When the full automatic mode is set, a distance measuring operation based on one distance measuring method is performed if distance measurement is unsuccessful with the other distance measuring method to provide a result of distance measurement on an object of interest. In this case, a distance measuring operation based on the passive distance measuring method is accompanied by the moving object predicting calculation process using the same means as described in detail in the first embodiment (see FIG. 8).

Figure 10:
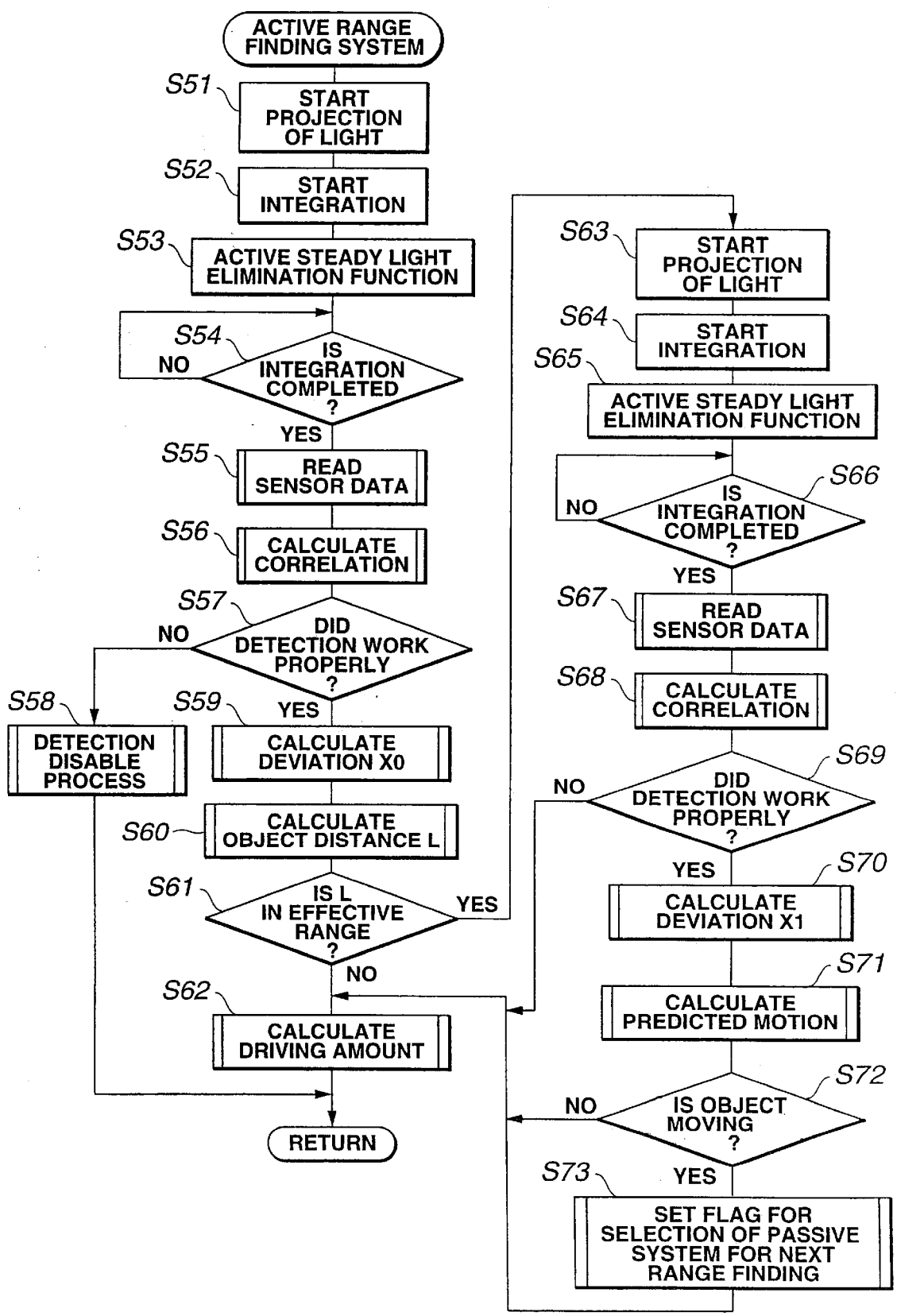
FIG. 10 is a flowchart showing a flow of an active distance measuring operation performed by a camera having an automatic focusing device according to a second embodiment of the invention when the photographic mode is set at a full automatic photographic mode.

When a distance measuring operation based on the active distance measuring method is performed, the moving object predicting calculation process is performed using means as shown in FIG. 10 to be described later.

A moving object predicting calculation process based on the active method has a problem in that it can accommodate only objects in relatively short ranges because an active distance measuring operation results in a reduction of the accuracy of focus detection on an object in a long range as described above.

In the present embodiment, when the execution of an active distance measuring operation is accompanied by a moving object predicting calculation process and the object is determined as a moving object by moving object determining means which determines whether an object of interest is a moving object, the distance measuring method is switched to the passive method to execute a distance measuring operation based on the passive method for subsequent distance measurements. This makes it possible to improve the accuracy of focus detection on a moving object of interest.

When the object of interest is in a relatively short range and there is a high possibility that the object is a moving object, control may be carried out to switch the distance measuring method to the passive method for subsequent measurements to detect the focus of the moving object with reliability.

The reason for limiting the photographic mode in which a distance measuring operation based on the active method is accompanied by a moving object predicting calculation process only to the full automatic mode is that the full automatic mode is a frequently used photographic mode and that it is not adequate to perform a moving object predicting calculation process during a distance measuring operation based on the active method in the other photographic modes.

FIG. 10 is a flow chart showing a flow of a distance measuring (or "range finding") process based on the active method executed when the full automatic mode is set as the photographic mode of a camera having an automatic focusing device according to the second embodiment of the invention.

An active distance measuring operation to be executed in any of the other photographic modes of the camera of the present embodiment has a common flow of processes similarly to the above-described first embodiment.

Specifically, in the present embodiment, as a distance measuring process based on the active method corresponding to the above-described step S13 in FIG. 7, a sequence as shown in FIG. 10 described below, i.e., an active distance measuring process including a moving object predicting calculation process is performed in the full automatic mode. On the other hand, a common distance measuring process based on the active method is performed in any other photographic mode, e.g., in the night scene mode or successive shooting mode or when the luminance of the object is lower than the predetermined value.

A flow of an active distance measuring process performed when the full automatic mode is set is as follows.

At step S51, the CPU 33 first performs a light projecting process in which it drives the light emitting element 35 by controlling the driver means 36 to project beams of infrared light in the form of pulses upon the object.

Figure 8:
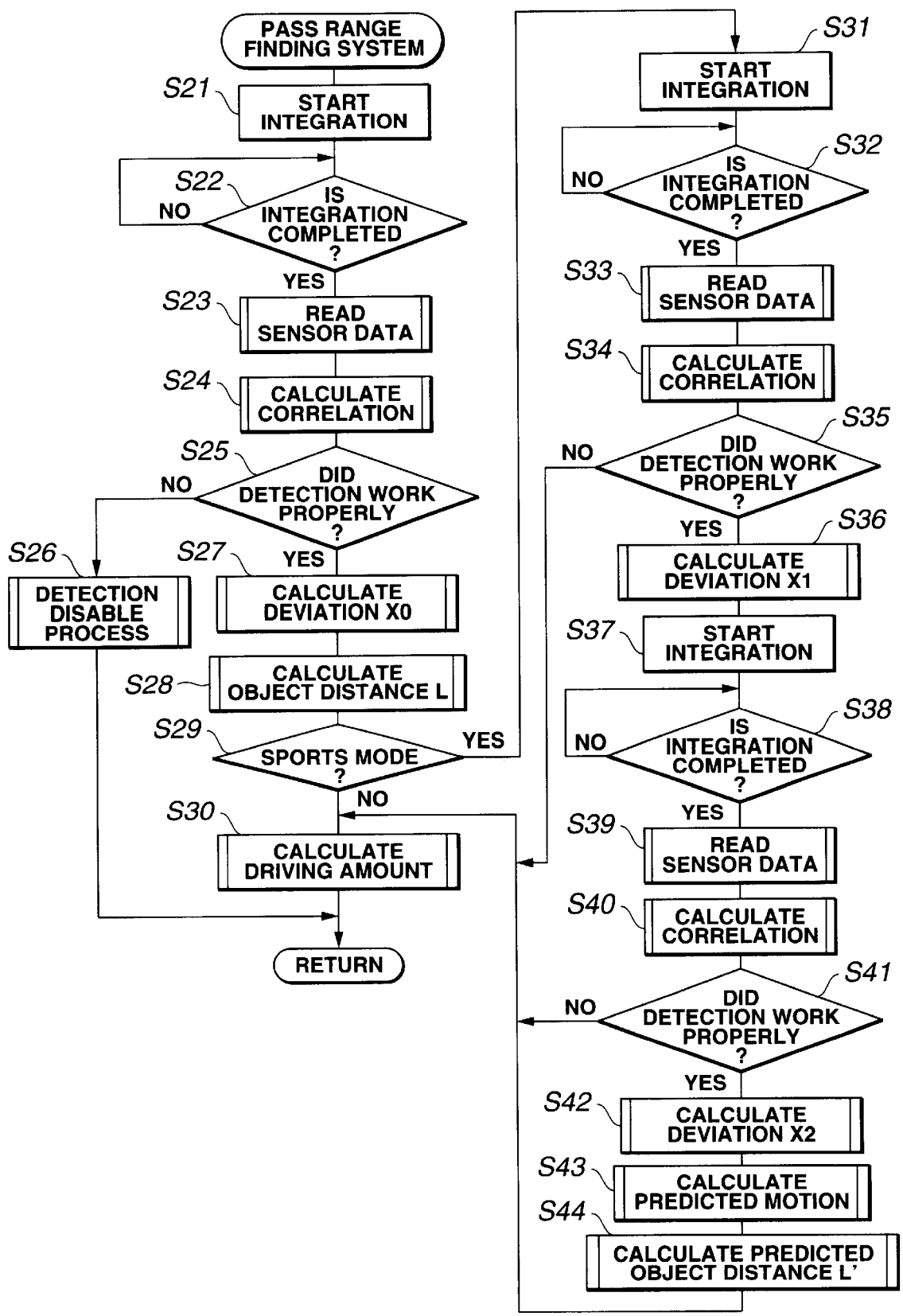
FIG. 8 is a flow chart showing a detailed flow of operations of a passive distance measuring process performed by the camera in FIG. 1.

At step S52, the CPU 33 initializes (resets) the AF-IC 23 and thereafter controls the line sensors 24L and 24R through the control means 31 to start a process of accumulating (integrating) photoelectrically converted charges (substantially similarly to step S21 in FIG. 8).

Next, step S53 turns on the functions of the steady light eliminating means 26 of storing a steady photoelectric current corresponding to an optical component associated with a background portion of an image among the photoelectric currents photoelectrically converted by each element and eliminating the same.

Processes at steps S54 through S60 are substantially the same as the processes at steps S22 through S28 in FIG. 8. Specifically, the process waits for the termination of an integrating operation based on a monitor signal output from the monitor signal output 28 at step S54 and proceeds to the process at the next step S55 after the termination of the integrating operation is confirmed.

At step S55, an output signal from each pixel of the line sensors 24L and 24R is output to an A-D converter (not shown) to be subjected to an A-D conversion process at the A-D converter. Thereafter, the digitized output signal is stored in a RAM (not shown) provided in the CPU 33 as sensor data (sensor data read process).

At step S56, the CPU 33 receives output signals 41L and 41R from the pixels and performs a correlation calculating process based on Equation 1.

At step S57, it is determined whether the correlation calculation was enabled or disabled (whether an effective result of focus detection can be obtained or not). For example, if it is determined here that the correlation calculation was disabled, the process proceeds to step S58 where the series of processes is terminated (return occurs) after a detection disable process which is a process of warning the user of the fact that the focus detecting operation is disabled by, for example, causing an LED (not shown) to blink or a process of switching to the passive distance measuring method for the distance measuring operation to follow the termination of the current active distance measuring operation.

When the next step s 59 is entered as a result of confirmation of a successful correlation calculating process at the above-described step S57, an arithmetic process for calculating an amount of deviation X0 is performed at step S59 based on the result obtained by the correlation calculation at the above-described step S56. Then, a process of calculating the object distance L is performed at step S60 using Equation 2.

It is determined at step S61 whether the value of the object distance L calculated at step S60 is within an effective range in which the accuracy of focus detection can be maintained. If the calculated object distance L is equal to or greater than a predetermined value, the process proceeds to step S62 based on a determination that a distance measuring operation based on the active method will not allow focus detection with an accurate result. If the calculated object distance L is within the predetermined range, the process proceeds to step S63 to perform a moving object predicting calculation operation.

At step S62, a driving amount calculation process is performed to calculate a driving amount for the photographic lens optical system 17 based on the object distance L obtained at step S60, and the sequence is thereafter terminated (return occurs) (substantially similarly to the process at step S30 in FIG. 30).

The same processes as those at the above-described steps S51 through S57 are performed at steps S63 through S69. Let us assume here that T1 represents the time spent from the beginning of the first integration by the process at the above-described step S51 until the termination of the current integration at step S64.

When it is determined that the correlation calculation is disabled at the next step S69, the moving object predicting calculation is stopped, and the process proceeds to the above-described step S62. At step S62, a process is performed to calculate a driving amount for the photographic lens optical system 17 based on the object distance L obtained at the above-described step S60. The sequence is then terminated (return occurs).

When it is confirmed at step S69 that the correlation calculation has provided a result of focus detection, the process proceeds to step S70 where a process of calculating an amount of deviation X1 is performed based on the result of the correlation calculation.

Next, the same process as that at the above-described step S43 is performed at step S71. That is, the process at step S71 is the same as the process at step S43 in FIG. 8. While a moving object predicting calculation process is repeated along with three times of integration as shown in FIG. 8 in the first embodiment, the motion prediction calculation process in the present embodiment is repeated twice for simplicity of description. A greater number of times may be set for the moving object predicting calculation process performed.

The process proceeds to step S72 when the moving object predicting calculation process is completed. It is determined at step S72 whether the object of interest is moving or not. This determination is made based on the amount of deviation Xn calculated at step S71.

If step S72 determines that the object is moving, the method proceeds to step S73. At step S73, a selection flag is set which is initialized in advance and which is provided to allow the selection a distance measuring operation of the type of the next distance measurement to be performed, i.e., the passive method. Thereafter, the process proceeds to step S62. At step S62, a process is performed to calculate a driving amount for the photographic lens optical system 17 based on the object distance L obtained at the above-described step S60 or step S73. The sequence is then terminated (return occurs).

The sequence in FIG. 10 is thus terminated, and a process corresponding to step S5 in the main routine of FIG. 6, i.e., a distance measuring process is performed and is followed by subsequent processes.

Specifically, when the first and second release switches are on and off respectively, passive distance measuring means is selected for the distance measuring process performed at the next step S5 to make a moving object predicting calculation according to the flow chart in FIG. 8 described above.

As described above, according to the second embodiment, a moving object predicting calculation is performed regardless which of the active and passive methods is used for a distance measuring operation performed when the full automatic mode that is normally used is selected. This makes it possible to obtain a reliable result of focus detection even when a moving object is photographed in the full automatic mode.

Since the moving object determining means determines whether an object of interest is a moving object or not, the accuracy of focus detection of a moving object is improved by switching to the distance measuring method to the passive method when the object to be photographed is a moving object.

Further, since control is carried out to switch the distance measuring method to the passive method when an object is in a relatively short range and is determined to be a moving object with a high degree of certainty, more reliable focus detection can be performed on a moving object.

Even when the selection of exposure modes, e.g., operation modes such as an aperture priority mode is allowed, a distance measuring method suitable for the selected operation mode is selected. In this case, a configuration may be employed in which when a moving object is detected during a first active distance measuring operation, the distance measuring method is switched to the passive method for the next distance measuring operation.

It is obvious that the present invention may be configured in widely varying modes for carrying out the invention without departing from the spirit and scope of the invention. The present invention is not limited to any particular modes except that it is limited by the appended claims.

What is claimed is:

1. A camera with an automatic focusing device, comprising:
   a first distance measuring unit having at least a pair of light receiving elements, for performing a distance measuring calculation by receiving a beam of light from an object;
   a second distance measuring unit having a light projecting portion for projecting a beam of light upon an object, for performing a distance measuring calculation by receiving a beam of light which is reflection of the beam of light projected by said light projecting portion; and
   a distance measuring method selecting unit for selecting said first distance measuring unit when performing an automatic focusing operation which is most suitable for photographing a moving object.

2. A camera according to claim 1, further comprising:
   a photographic mode selecting unit for selecting a desired photographic mode from among a plurality of preset photographic mode,
   wherein said plurality of photographic modes include a moving object shooting mode.

3. A camera according to claim 2, wherein said distance measuring method selecting unit selects said first distance measuring unit when said photographic mode selecting unit selects said moving object shooting mode.

4. A camera according to claim 3, wherein said first distance measuring unit performs a moving object predicting calculation process.

5. A camera according to claim 1, further comprising:
   a moving object determining unit for determining whether an object is moving or not,
   wherein said distance measuring method selecting unit selects said first distance measuring unit when said moving object determining unit determines that an object of interest is in a moving state.

6. A camera according to claim 1, wherein said first distance measuring unit performs a passive distance measuring calculation.

7. A camera according to claim 1, wherein said second distance measuring unit performs an active distance measuring calculation.

8. A camera with an automatic focusing device, comprising:
   a first distance measuring unit having at least a pair of light receiving elements, for performing a passive distance measuring calculation by receiving a beam of light from an object;
   a second distance measuring unit having a light projecting portion for projecting a beam of light upon an object, for performing an active distance measuring calculation by receiving a beam of light which is reflection of the beam of light projected by said light projecting portion;
   a distance measuring method selecting unit for selecting either said first distance measuring unit or said second distance measuring unit; and
   photographic mode selecting unit for selecting a desired photographic mode from among a plurality of photographic modes including at least a moving object shooting mode and a full automatic photographic mode,
   wherein said distance measuring method selecting unit selects said first distance measuring unit when said photographic mode selecting unit selects the moving object shooting mode.

9. A camera according to claim 8, wherein an amount of deviation between the positions of images formed by said pair of light receiving elements is calculated a plurality of times when said photographic mode selecting unit selects the moving object shooting mode.

10. A camera according to claim 9, wherein a moving object predicting calculation for obtaining a predicted amount of deviation is performed based on the amount of deviation calculated by said plurality of calculations.

11. A camera according to claim 10, wherein a predicted distance of an object is calculated based on said predicted amount of deviation.

12. A camera according to claim 11, wherein a driving amount for a photographic optical system is calculated based on said predicted distance of an object.

13. A camera according to claim 8, wherein said distance measuring method selecting unit selects either said first distance measuring unit or said second distance measuring unit when said photographic mode selecting unit selects the full automatic photographic mode and selects the other distance measuring unit when no result is available from measurement performed by selected distance measuring unit.

14. A camera according to claim 13, wherein an amount of deviation between the positions of images formed by said pair of light receiving elements is calculated a plurality of times when said distance measuring method selecting unit selects said first distance measuring unit.

15. A camera according to claim 14, wherein a moving object predicting calculation for obtaining a predicted amount of deviation is performed based on the amount of deviation calculated by said plurality of calculations.

16. A camera according to claim 15, wherein a predicted distance of an object is calculated based on said predicted amount of deviation.

17. A camera according to claim 16, wherein a driving amount for a photographic optical system is calculated based on said predicted distance of an object.

18. A camera according to claim 13, wherein an amount of deviation between the positions of images formed by said pair of light receiving elements is calculated a plurality of times when said distance measuring method selecting unit selects said second distance measuring unit.

19. A camera according to claim 18, wherein a moving object predicting calculation for obtaining a predicted amount of deviation is performed based on the amount of deviation calculated by said plurality of calculations.

20. A camera according to claim 19, wherein it is determined whether an object of interest is moving or not based on said predicted amount of deviation.

21. A camera according to claim 20, wherein said distance measuring method selecting unit sets a selection flag for selecting said first distance measuring unit at the next selecting operation by said distance measuring method selecting unit when it is determined that said object of interest is moving.

22. A camera according to claim 8, wherein setting in accordance with the environment of an object of interest is automatically made in said full automatic photographic mode.

23. A method for automatically focusing a camera having a first distance measuring unit for performing a passive distance measuring calculation and a second distance measuring unit for performing an active distance measuring calculation, the method comprising:
- selecting a desired photographic mode from among a plurality of photographic modes;
- selecting said first distance measuring unit as a distance measuring unit to perform a distance measuring calculation when a moving object shooting mode is selected; and
- performing a distance measuring calculation including a moving object predicting calculation process if said first distance measuring unit is selected.

24. A method for automatically focusing a camera having a first distance measuring unit for performing a passive distance measuring calculation and a second distance measuring unit for performing an active distance measuring calculation, the method comprising:
- selecting a desired photographic mode from among a plurality of photographic modes;
- selecting said second distance measuring unit as a distance measuring unit to perform a distance measuring calculation when a full automatic photographic mode is selected;
- performing a distance measuring calculation including a moving object predicting calculation process with said second distance measuring unit selected;
- determining whether an object is moving or not based on a result of the moving object predicting calculation process; and
- setting a selection flag for selecting said first distance measuring unit at a next selection process when an object is determined to be a moving object.

* * * * *